United States Patent
Shimada et al.

(10) Patent No.: US 8,571,393 B2
(45) Date of Patent: Oct. 29, 2013

(54) PORTABLE RECORDING MEDIUM, VIDEO RECORDING/REPRODUCING APPARATUS, VIDEO RECORDING/REPRODUCING METHOD, VIDEO REPRODUCING APPARATUS, VIDEO RECORDING APPARATUS, VIDEO REPRODUCING METHOD, AND VIDEO RECORDING METHOD

(75) Inventors: Masaaki Shimada, Tokyo (JP); Isao Otsuka, Tokyo (JP); Masaharu Ogawa, Tokyo (JP); Kazuhiko Nakane, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1762 days.

(21) Appl. No.: 10/562,551

(22) PCT Filed: Jun. 11, 2004

(86) PCT No.: PCT/JP2004/008587
§ 371 (c)(1),
(2), (4) Date: Dec. 28, 2005

(87) PCT Pub. No.: WO2005/004473
PCT Pub. Date: Jan. 13, 2005

(65) Prior Publication Data
US 2007/0065111 A1    Mar. 22, 2007

(30) Foreign Application Priority Data
Jul. 4, 2003    (JP) ................................ 2003-191792

(51) Int. Cl.
*H04N 5/77*    (2006.01)
(52) U.S. Cl.
USPC ........................................................ 386/361

(58) Field of Classification Search
USPC ............................................................ 386/83
See application file for complete search history.

(56) References Cited

U.S. PATENT DOCUMENTS

| | | | | |
|---|---|---|---|---|
| 5,854,873 A * | 12/1998 | Mori et al. | ....................... | 386/92 |
| 6,580,870 B1 * | 6/2003 | Kanazawa et al. | .............. | 386/95 |
| 2005/0273819 A1 * | 12/2005 | Knudson et al. | ................ | 725/58 |

FOREIGN PATENT DOCUMENTS

| | | |
|---|---|---|
| JP | 5-54465 A | 3/1993 |
| JP | 10-69756 A | 3/1998 |
| JP | 10-93905 A | 4/1998 |
| JP | 11-161663 A | 6/1999 |
| JP | 2002-140882 A | 5/2002 |
| JP | 2003-189197 A | 7/2003 |

* cited by examiner

*Primary Examiner* — William C Vaughn, Jr.
*Assistant Examiner* — Daniel Tekle
(74) *Attorney, Agent, or Firm* — Birch, Stewart, Kolasch & Birch, LLP

(57) ABSTRACT

A recording medium (100) for a reservation of video recording of a program holds encoded compressed video information (1531) related to the program, a reservation set command (331) for setting a reservation of the program, and program attribute information (323) including at least a video recording reservation start date and time. When a viewer makes a selection to set a reservation of video recording while watching a preview video (200) based on the encoded compressed video information of the recording medium in a video recording/reproducing apparatus, the video recording/reproducing apparatus acquires the program attribute information (332) in accordance with the reservation set command (331) in the recording medium (100), thereby setting a reservation of video recording. Thus, there in no need of manual operation for inputting information required for setting a reservation of video recording and it is possible to easily set a reservation of video recording of the program while watching and listening to program-related information.

21 Claims, 14 Drawing Sheets

PORTABLE RECORDING MEDIUM, VIDEO RECORDING/REPRODUCING APPARATUS, VIDEO RECORDING/REPRODUCING METHOD, VIDEO REPRODUCING APPARATUS, VIDEO RECORDING APPARATUS, VIDEO REPRODUCING METHOD, AND VIDEO RECORDING METHOD

TECHNICAL FIELD

The present invention relates to a recording medium for video or audio recording reservation, which is optimum for a reservation of video recording or audio recording of a broadcast received on the television, the radio, or the like; and a video recording/reproducing apparatus, a video reproducing apparatus, a video recording apparatus, a video recording/reproducing method, a video reproducing method, and a video recording method that are provided for recording data on and/or reproducing data from the recording medium.

BACKGROUND ART

There is a method of setting a reservation of video recording that has been widely and conventionally used and requires a numeral code, referred to as a G code, shown in a TV listing on a newspaper, a magazine, and the like, to be input. See User's Manual of Toshiba HDD&DVD video recorder "RD-X1", Toshiba Corporation, 2001, pp. 70-72, "G code reservation", for example.

Further, there is another method of setting a reservation of video recording including the steps of receiving and storing TV program information sent from a TV broadcast station, converting a program name input by the operator into information of a TV channel, broadcast start date and time, and broadcast end date and time in accordance with the TV program information, standing ready for a reservation of video recording, and performing video recording. See Japanese Patent Kokai (Laid-open) Publication No. 5-54465, pp. 1-3, FIG. 1, for example.

Furthermore, there is a proposal of a video recorder that includes a means for providing video information of a broadcast program and its reservation information of video recording in the form of a DVD medium, a means for allowing the video recorder to read information from the DVD medium, and a means for allowing a reservation of video recording to be set by a remote controller while reproducing a video. See Japanese Patent Kokai (Laid-open) Publication No. 10-069756, pp. 1-6, FIGS. 1-5, for example.

The above-mentioned method for setting a reservation of video recording using a G code eliminates the need for manual input of program attribute information necessary for a reservation of video recording, such as a reservation date, channel, program start time, and program end time, but the input of a G code shown in a TV listing on a newspaper, a magazine, and the like is required. Therefore, mistakes are unavoidable in the troublesome input step. Since operating methods vary among models, it has been hard to operate a model which is not familiar.

In the video recording reservation setting method that receives and stores TV program information sent from TV broadcast stations and converts a program name input by the operator into program attribute information in accordance with the TV program information, the operator must still take the time and trouble to input a correct program name appearing in a newspaper, a magazine, or the like. If the program name is long, the operator would not be able to memorize the name at one time and would have to check the input information against the information on a newspaper, a magazine, or the like.

These two methods impose such a great inconvenience that the operator cannot set any reservation of video recording without having a newspaper, a magazine, or the like at hand. Since the operator is forced to select a program, relying upon just the character information obtained from a newspaper, a magazine, or the like at hand, the operator may not be able to reserve a program on the basis of the sufficient information of the program.

In the video recording reservation setting method that uses video information of a broadcast program and its reservation information of video recording provided in the form of a DVD, the operator can set the reservation of video recording just by determining a selection on a remote controller while watching a broadcast program. However, there is some question as to when the viewer should set the reservation of video recording, and the reliability of the setting of the reservation of video recording would be inferior sometimes. In addition, the information is recorded in a unique format, and a DVD of a new format has to be developed.

DISCLOSURE OF INVENTION

The present invention, which has been made to resolve the problems described above, provides a portable recording medium that eliminates the need for manual input of program attribute information necessary for setting a reservation of video recording of a program, allows simple and reliable setting of a reservation of video recording, and ensures a high degree of reproduction compatibility with the current video recording/reproducing apparatuses, a video recording/reproducing apparatus for reproducing the recording medium, a video reproducing apparatus, and a video recording apparatus, a video recording/reproducing method, a video reproducing method, and a video recording method.

The portable recording medium of the present invention holds encoded compressed video information and/or encoded compressed audio information, which are related to a program to be broadcasted; a reservation set command for setting a reservation of video recording and/or audio recording of the program; and program attribute information including at least a broadcast start time of the program.

Further, the video recording/reproducing apparatus of the present invention reproduces data from the portable recording medium described above, and includes a means for obtaining the reservation set command of the portable recording medium; and a means for obtaining program attribute information in accordance with the reservation set command and setting a reservation of video recording and/or audio recording in accordance with the program attribute information.

Furthermore, the video recording/reproducing method of the present invention is used for reproducing the portable recording medium, and includes the steps of obtaining the reservation set command of the portable recording medium; and obtaining the program attribute information in accordance with the reservation set command and setting a reservation of video recording and/or audio recording on the basis of the program attribute information.

BEST MODE FOR CARRYING OUT THE INVENTION

First Embodiment

Figure 1:
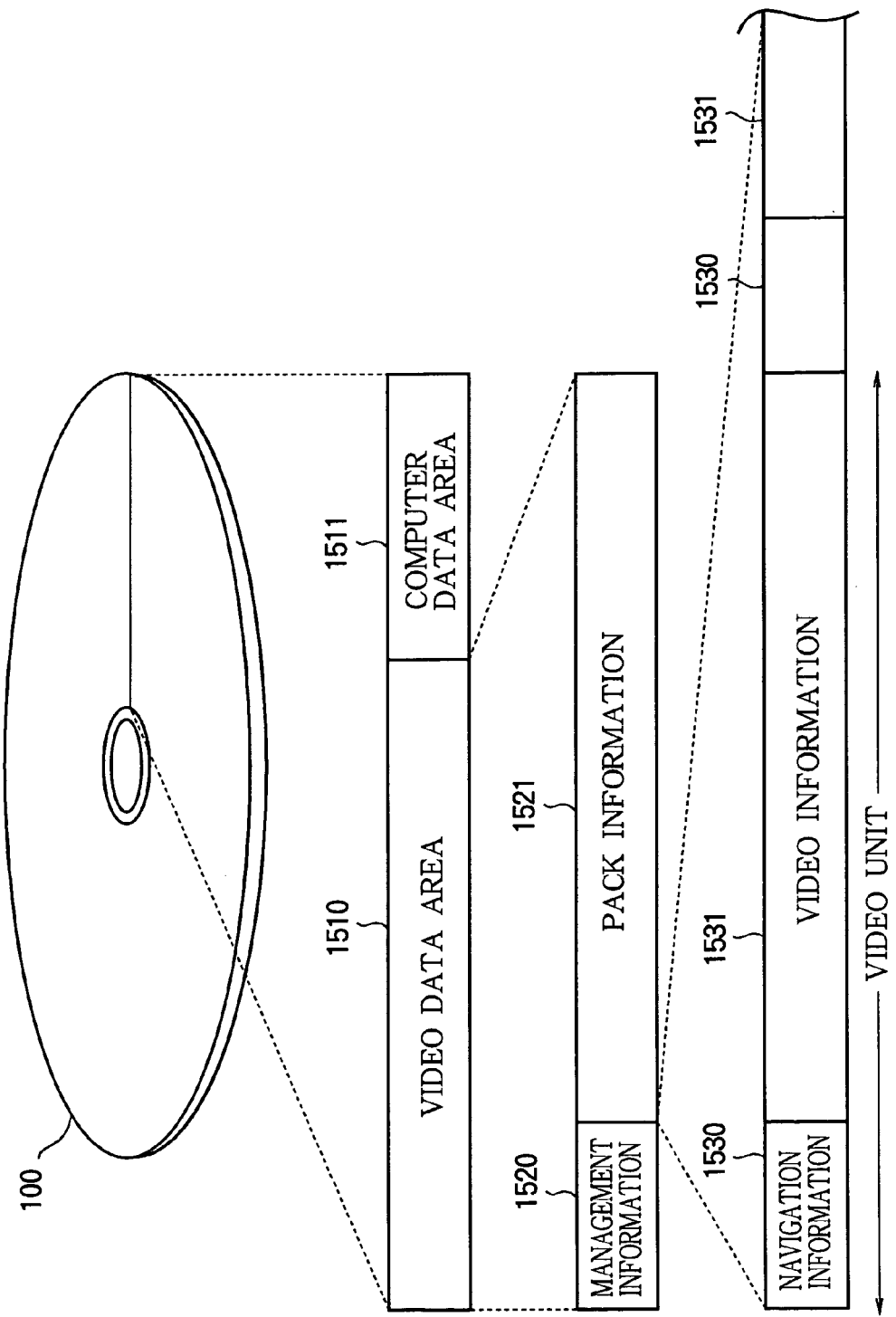
FIG. 1 is a diagram showing an appearance of an optical disk and an internal file data structure.

FIG. 1 shows an appearance of an optical disk and an internal file data structure. In the figure, the internal file data structure of an optical disk 100 includes a video data area 1510 and a computer data area 1511. These data can be recorded in a mixed state, and each area can have any recording size. Computer data to be processed by a personal computer or the like are recorded on the computer data area 1511. The video data area 1510 contains management information 1520 and pack information 1521.

The management information 1520 is provided in a lump on the inner area side or other area of the optical disk 100, includes an information table used to manage the whole of the optical disk 100, and contains a command to be executed before or after video data is reproduced, a video data reproduction sequence, and the like. The pack information 1521 includes navigation information 1530 and video information 1531. The navigation information 1530 is control information to be used to reproduce video data, and includes a command to be executed when the selection of an overlaid button is determined while reproduced video data is being displayed, video synchronization information, and the like. The video information 1531 corresponds to main part of video data which has been encoded and compressed. The navigation information 1530 is dispersedly disposed in the pack information 1521 and is placed at a leading end of each video unit. The video unit consists of a group of picture (GOP) defined in the MPEG-2 standard. The video unit includes an I-picture, data of which is compressed within a frame, a P-picture, data of which is compressed with motion compensation of the I-picture preceding in time, and a B-picture, data of which is compressed with motion compensation of the I-picture or P-picture preceding or following in time. The video unit is divided in units of about 0.5 seconds of reproduction time, for example. The reproduction of the video information 1531 is controlled in accordance with the navigation information 1530 in video units. The video information 1531 is managed in the unit of a program chain, which is a group of plural video units of each program. The reproduction of the unit, i.e., the program chain is controlled in accordance with the management information 1520. A plurality of program chains can be recorded in a single optical disk 100.

The navigation information 1530 includes button information of a button which can be selected or set on the screen by the viewer. In the first embodiment, the button information includes button information related to a reservation of video recording.

Figure 2:
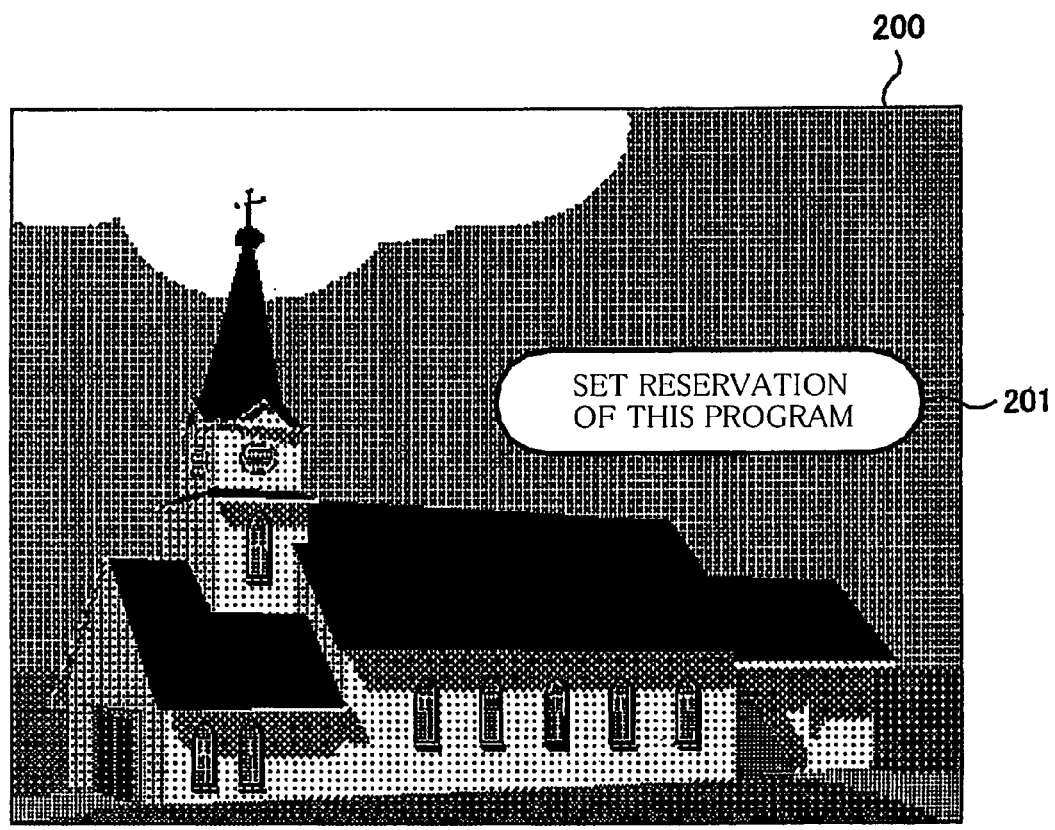
FIG. 2 shows an example of a displayed image on a screen in a first embodiment.

FIG. 2 shows an example of a displayed image on a screen when the optical disk 100 in the first embodiment is being played. A video recording reservation button 201 is a button overlaid on video display information 200 displayed on the screen in accordance with the encoded compressed video information related to the program to be broadcasted, and the button is used to select whether a reservation of video recording of the program is set or not.

The video recording reservation button 201 is a displayed character information (sub-picture) included in the video information 1531, in accordance with the button information included in the navigation information 1530 such as button position information, display start time information, display end time information, and button color information. The character information (sub-picture) and the button information used to display the video recording reservation button 201 forms the video information for reservation setting of the present invention.

Figure 3:
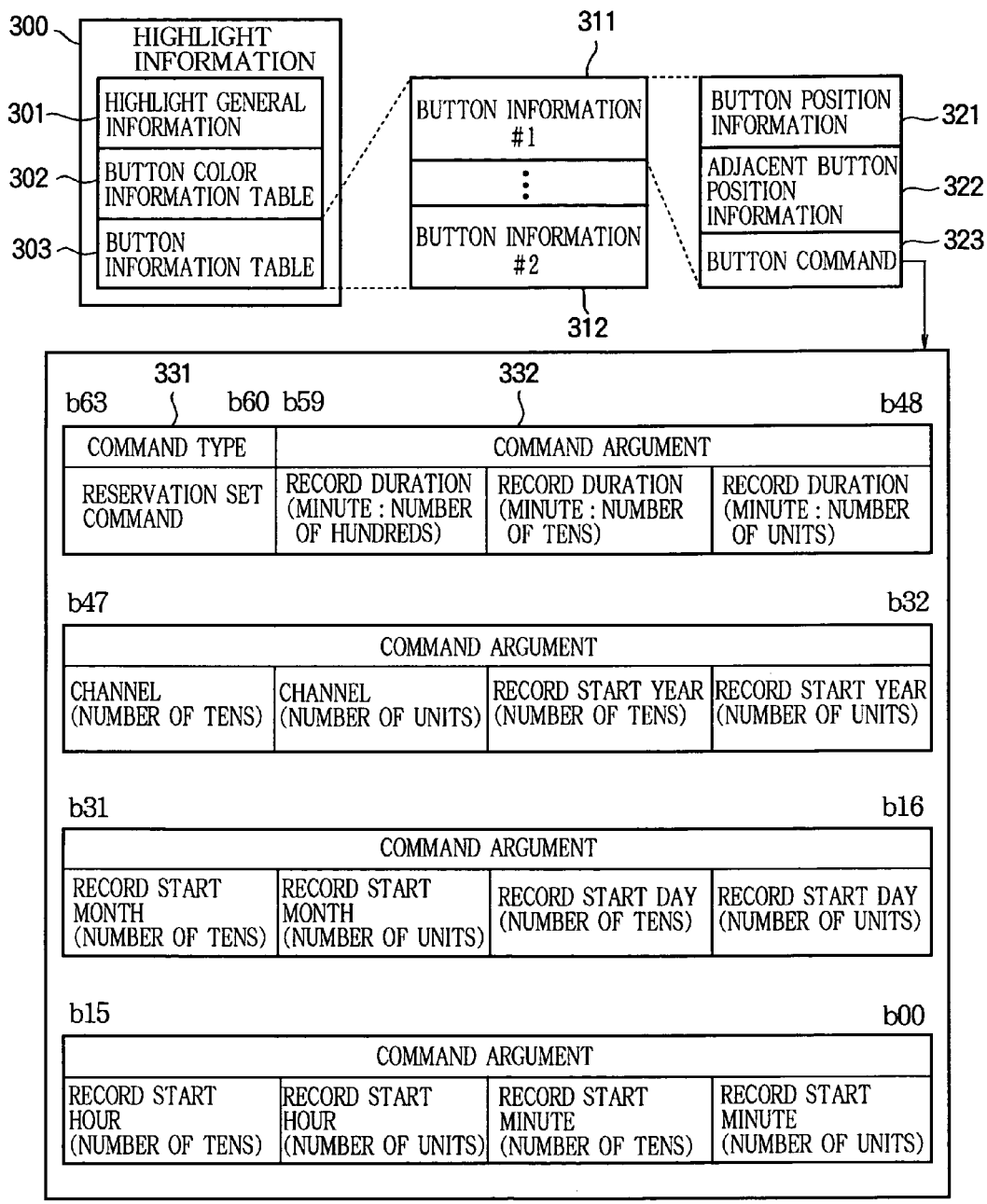
FIG. 3 shows a data structure related to button information in the first embodiment.

FIG. 3 shows a data structure related to the button information in the first embodiment. The button information includes the following information of each button: position information, adjacent button information, and command data to be executed when the selection of the button is determined (hereinafter referred to as a button command). The command data can contain an instruction to control a reproduction operation. The present invention is characterized by using the command data to control a function, which the viewer used to control directly by means of a key or a remote controller in a video recording/reproducing apparatus.

Data related to the button information is placed in highlight information 300 in the navigation information 1530. The highlight information 300 includes highlight general information 301, a button color information table 302, and a button information table 303. The highlight general information 301 includes general information related to highlighting, and the button color information table 302 includes selection color information and decision color information. The button information table 303 contains one or more items of button information 311 and 312. The button information table 303 contains button position information 321, adjacent button position information 322, and a button command 323 of each button. The button position information 321 represents a display position and size of the button; the adjacent button position information 322 includes adjacent button position information indicating a button number to which the highlight moves; and the button command 323 contains command information defining the behavior of the video reproducing apparatus when the selection of the button is determined.

The button command 323 includes a command type 331 and a command argument 332. The command type 331 indicates a basic instruction type, and the command argument 332 is used as a qualifier to the command type 331. In this embodiment, the command type 331 of the button command 323 contains "a reservation set command" for setting a reservation of video recording of the program, and the command argument 332 of the button command 323 includes "program attribute information" including at least the broadcast start time of the program.

FIG. 3 shows an example of code implementation on the assumption that the command is 64 bits long. If an area from the 63rd bit to the 60th bit assigned as the command type 331 is set to 4-bit '1111', the command is processed as "a reservation set command."

The command argument 332 includes "program attribute information" necessary for setting a reservation of video recording, specified in the BCD unit or the like, such as "channel", "record start date", "record start time", and "record duration." In this bit assignment, an area from the 59th bit to the 48th bit are assigned to the record duration in minutes, and the number of hundreds, the number of tens, and the number of units of the record duration are specified. Further, an area from the 47th bit to the 40th bit represents a channel, and the number of tens and the number of units of the channel are specified. Furthermore, an area from the 39th bit to the 32nd bit are assigned to the last two numbers of years of the record start date, and the number of tens and the number of units of years of the record start date are specified. An area from the 31st bit to the 24th bit is assigned to months of the record start date, and the number of tens and the number of units of months of the record start date are specified. Moreover, an area from the 23rd bit to the 16th bit is assigned to days of the record start date, and the number of tens and the number of units of days of the record start date are specified. An area from the 15th bit to the 8th bit is assigned to hours of the record start time, and the number of tens and the number of units of hours of the record start time are specified. An area from the 7th bit to the 0th bit is assigned to minutes of the record start time, and the number of tens and the number of units of minutes of the record start time are specified.

A record end time may be included in the program attribute information instead of or in addition to the record duration.

Figure 4:
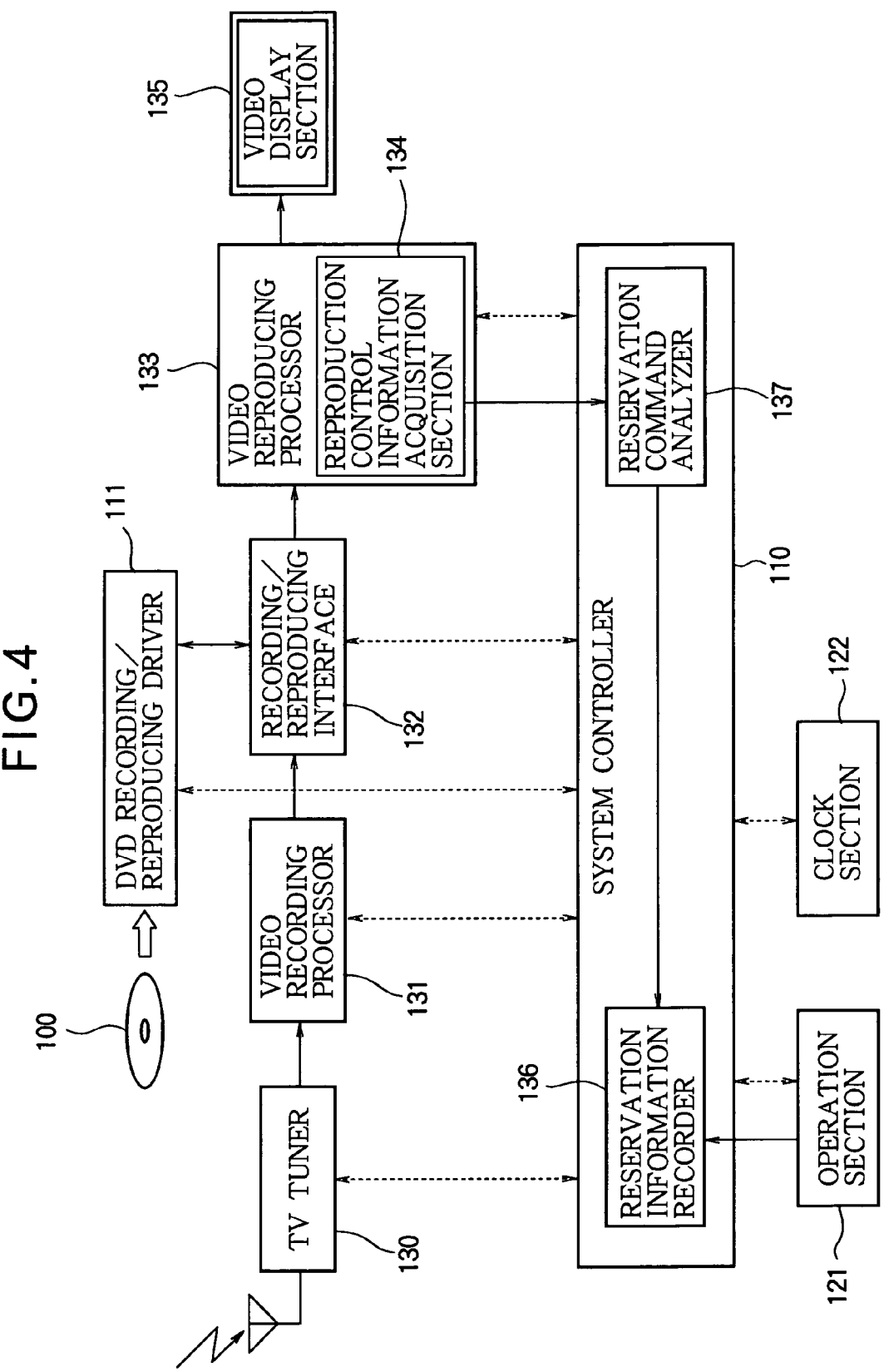
FIG. 4 is a block diagram showing a configuration of a video recording/reproducing apparatus in the first embodiment.

FIG. 4 is a block diagram showing the entire configuration of the video recording/reproducing apparatus of the first embodiment. A system controller 110 integrally controls the whole of the video recording/reproducing apparatus. A DVD recording/reproducing driver 111 reads or writes a signal from or into the optical disk 100. An operation section 121 is remote-control keys and/or keys on the apparatus used by the viewer to make input to the system controller 110. A clock section 122 gives time information to the system controller 110. A TV tuner 130 generates an analog video signal selected from the received television broadcast and supplies the signal to a video recording processor 131. The video recording processor 131 performs MPEG compression encoding of the analog video signal output from the TV tuner 130, and supplies the result to a recording/reproducing interface 132. Then, the recording/reproducing interface 132 reads or writes a signal after modulation, demodulation, error correction, and the like from or into the DVD recording/reproducing driver 111. A video reproducing processor 133 separates the signal output from the recording/reproducing interface 132 to produce reproduction control information and MPEG encoded compressed video information. The separated reproduction control information is stored in a reproduction control information acquisition section 134 in the video reproducing processor 133. Further, the video reproducing processor 133 performs decompression encoding of the separated video information, generates an analog video signal, and outputs it to a video display section 135.

The system controller 110 includes a reservation information recorder 136 and a reservation command analyzer 137. If the video recording reservation button 201 shown in FIG. 2 is displayed when the optical disk 100 is being played and if the selection is made to set a reservation of video recording, the reservation command analyzer 137 obtains the program attribute information of the navigation information 1530, in accordance with the reservation set command in the navigation information 1530 held in the reproduction control information acquisition section 134. In addition, the reservation command analyzer 137 converts the obtained program attribute information into a data format specified by the reservation information recorder 136, and supplies the information to the reservation information recorder 136. The program attribute information is recorded in the reservation information recorder 136.

Figure 5:
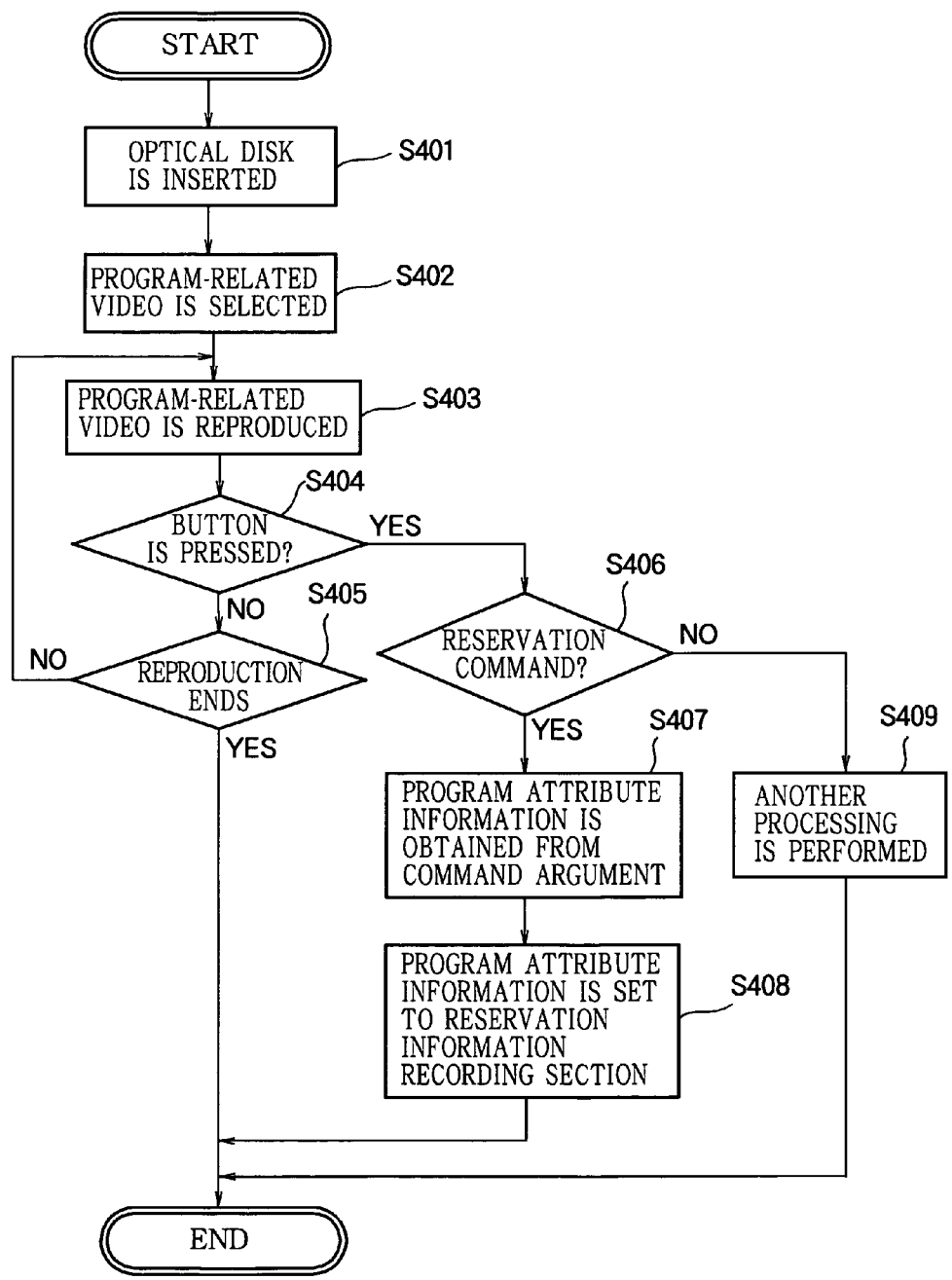
FIG. 5 is a flow chart showing setting process of a reservation of video recording in the first embodiment.

FIG. 5 shows a flow chart showing setting process of a reservation of video recording in the first embodiment. When the optical disk 100 is inserted into the DVD recording/reproducing driver 111 (S401), the management information 1520 in the optical disk 100 is accumulated in the reproduction control information acquisition section 134, as required by the system controller 110. The management information 1520 is necessary to reproduce the video information 1531 recorded in the video data area 1510 of the optical disk 100, and the information is held as data that can be accessed by the system controller 110 at any time.

When a selection screen (menu screen) for the video to be viewed is displayed on the video display section 135, the viewer selects the video (program chain) related to a desired program from the group of programs recorded in the optical disk 100, through the operation section 121 (S402). The system controller 110 acquires the reproduction information of the selected program chain from the management information 1520 accumulated in the reproduction control information acquisition section 134, and issues an instruction to supply the pack information 1521 of the corresponding program chain from the optical disk 100 to the video reproducing processor 133 in accordance with the reproduction information. The video reproducing processor 133 separates the supplied pack information 1521 to produce the navigation information 1530 and the encoded compressed video information 1531. The navigation information 1530 is also handled as data that can be accessed by the system controller 110 at any time, but this information is refreshed at certain intervals. After the video information 1531 is encoded decompressed, the video display section 135 reproduces the analog video signal to display an image.

The system controller 110 obtains the navigation information 1530, which is synchronized with the reproduced video, from the reproduction control information acquisition section 134. The highlight information 300 in the navigation information 1530 includes button information synchronized with the video. The video display section 135 reproduces the video display information 200 related to the program to be broadcasted with the video recording reservation button 201 for selecting whether to set a reservation of video recording of the program overlaid or not, as shown in FIG. 2 (S403).

The selection of the video recording reservation button 201 can be made from the operation section 121 (S404). If the viewer recognizes that the video is of a program he wants to watch while he is viewing the video display information 200 shown in FIG. 2 and if the setting of a reservation of video recording is desired, the selection of the video recording reservation button 201 is made from the operation section 121. If the video is of a program that the viewer does not want to watch, he may leave the video recording reservation button 201 unselected until the video ends (S405).

If the selection that a reservation of video recording is set is made by the video recording reservation button 201, the system controller 110 references the highlight information 300 held in the reproduction control information acquisition section 134 to obtain the information of the button command 323 specified for the video recording reservation button 201. If the command type 331 of the button command 323 is assigned a bit string indicating a reservation set command, the system controller 110 judges that the button command 323 sets a reservation of video recording (S406). Then, the reservation command analyzer 137 obtains program attribute information from the command argument 332 of the button command 323 (S407), converts the information into reservation information of video recording that can be recognized by the reservation information recorder 136, and transfers the reservation information of video recording to the reservation information recorder 136. The reservation information recorder 136 specifies the obtained reservation information of video recording to set a reservation of video recording of the video recording/reproducing apparatus (S408). If the reservation information of video recording specified for setting the reservation of video recording overlaps or if a past time is set as the reservation record start time, the system controller 110 informs the viewer that the reservation of video recording cannot be normally set.

If the optical disk 100 is video-recordable, a program can be recorded in the same optical disk. If the disk is a reproduction-only disk or is a writable disk without a sufficient storage space, the system controller 110 prompts the viewer to replace the disk. When the viewer replaces the disk with a writable optical disk, the standby state for program recording is established.

If the button command 323 of video recording reservation button 201 is not assigned as "a reservation set command", the video recording/reproducing apparatus performs processing based on a command system defined under another scheme, such as transition to another program at the press of the button and modification to system-specific parameter settings (S409).

When a reservation of video recording is set, a user interface for specifying a recording rate, which determines the recorded image quality, may be provided. In that case, when the video recording/reproducing apparatus obtains reservation information of video recording, the video recording/reproducing apparatus displays a screen for prompting the viewer to select a recording rate. When the viewer selects a desired recording rate from the operation section 121, a reservation of video recording at a certain recording rate can be set.

After the reservation of video recording is set (S408) to establish the standby state for program recording, the system controller 110 compares the current time information provided by the clock section 122 and the "reservation date" and the "record start time" held in the reservation information recorder 136 as occasion arises. When the current time information reaches the "record start time" of the reservation information of video recording, the TV tuner 130 is tuned to a specified channel in accordance with the "channel" information of the reservation information of video recording, and an analog video signal is supplied to the video recording processor 131. Then, the video recording processor 131 performs MPEG compression encoding in accordance with the control signal from the system controller 110 to output the signal with control data added to the recording/reproducing interface 132. The recording/reproducing interface 132 carries out format conversion of the output signal for recording on the optical disk 100 or a writable optical disk in accordance with the control signal from the system controller 110, and outputs data to the DVD recording/reproducing driver 111 at certain intervals. The DVD recording/reproducing driver 111 starts video recording in a television method by writing the output signal into the optical disk 100 or the writable optical disk successively. Once the setting of a reservation of video recording normally starts, the system controller 110 compares the current time and the "record duration" held in the reservation information recorder 136 as occasion arises. When the record duration of the reservation information of video recording is reached, an instruction to stop the video recording operation is given to the video recording processor 131, recording/reproducing interface 132, and DVD recording/reproducing driver 111, thereby ending the program recording operation.

Figure 6:
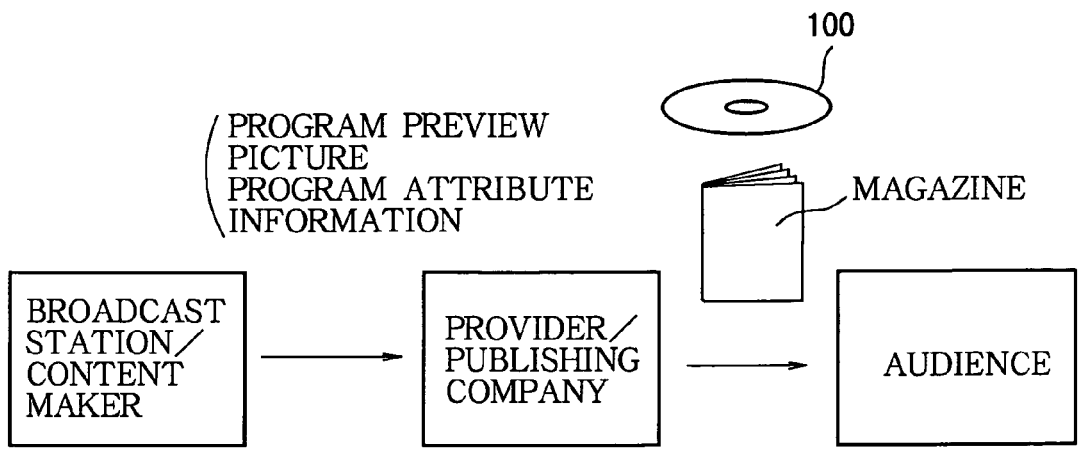
FIG. 6 is a schematic diagram showing a configuration of a sales system using an optical disk of the present invention.

FIG. 6 is a schematic diagram showing a configuration of a sales system using an optical disk. The optical disk 100 is purchased periodically by the viewer as a supplement to a program guide, a magazine describing programs to be broadcasted, and the like. Alternatively, the optical disk 100 may be sold alone. The optical disk 100 contains preview video information related to programs or program content video and the program attribute information used for setting a reservation of video recording, as described above. A provider or publisher selling the optical disk 100 gets the information from broadcast stations or contents providers, and produces and sells the optical disk 100 to the audience.

In the first embodiment described above, the program attribute information such as the immediate data of broadcast start date and time is specified as the reservation information of video recording in the command argument 332. However, the reservation information of video recording may also include numerical information such as a G code.

An identifier indicating whether the optical disk 100 is a reservation-only disk or a general-purpose disk may be provided in the computer data area 1511 or management information 1520 on the optical disk 100. This prevents a general-purpose disk from being misidentified as a reservation-only optical disk of the present invention and a reservation of video recording from being set accidentally even if the disk has the same bit information as the code of a reservation set command in the reproduction control information area. In this case, it is first judged from the identifier whether a reservation of video recording can be set in accordance with the reservation set command. In accordance with the judgment regarding whether the setting can be executed, the reservation of video recording is set on the basis of the reservation set command and the program attribute information as described above.

According to the first embodiment, the user can set a reservation of video recording through simple operation such as selecting a button while viewing a video, so that a video recording reservation setting apparatus having a simple, easy-to-learn operating system can be provided. In addition, each button can have video recording reservation setting data, and a plurality of video recording reservation set buttons can be placed on one frame of video. A reservation of video recording can be set with a higher degree of flexibility by updating the button depending on a scene of a broadcast program.

Second Embodiment

In the first embodiment, the reservation set command and the program attribute information that relate to a reservation of video recording are included in the navigation information 1530. In contrast, in the second embodiment, they are included in management information 1520.

Figure 7:
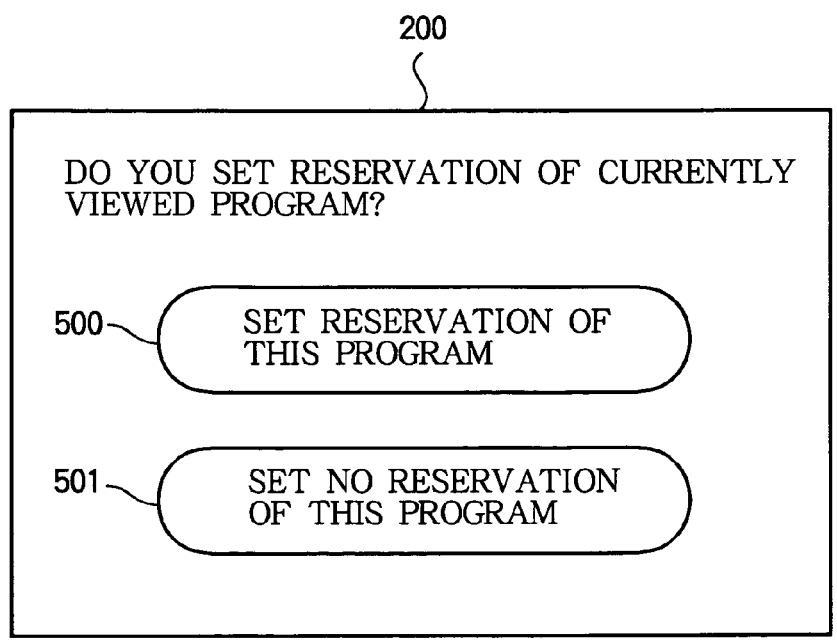
FIG. 7 shows an example of a displayed image on a screen in a second embodiment.

FIG. 7 shows an example of a displayed image on a screen when an optical disk 100 is being played in the second embodiment. A video recording reservation set button 500 is selected to set a reservation of video recording of the program to be broadcasted, and a video recording reservation non-set button 501 is selected to set no reservation of video recording of the program. Video display information 200 including the video recording reservation set button 500 and the video recording reservation non-set button 501 is displayed by the video reproducing apparatus in accordance with a reservation set command, which will be described later.

Figure 8:
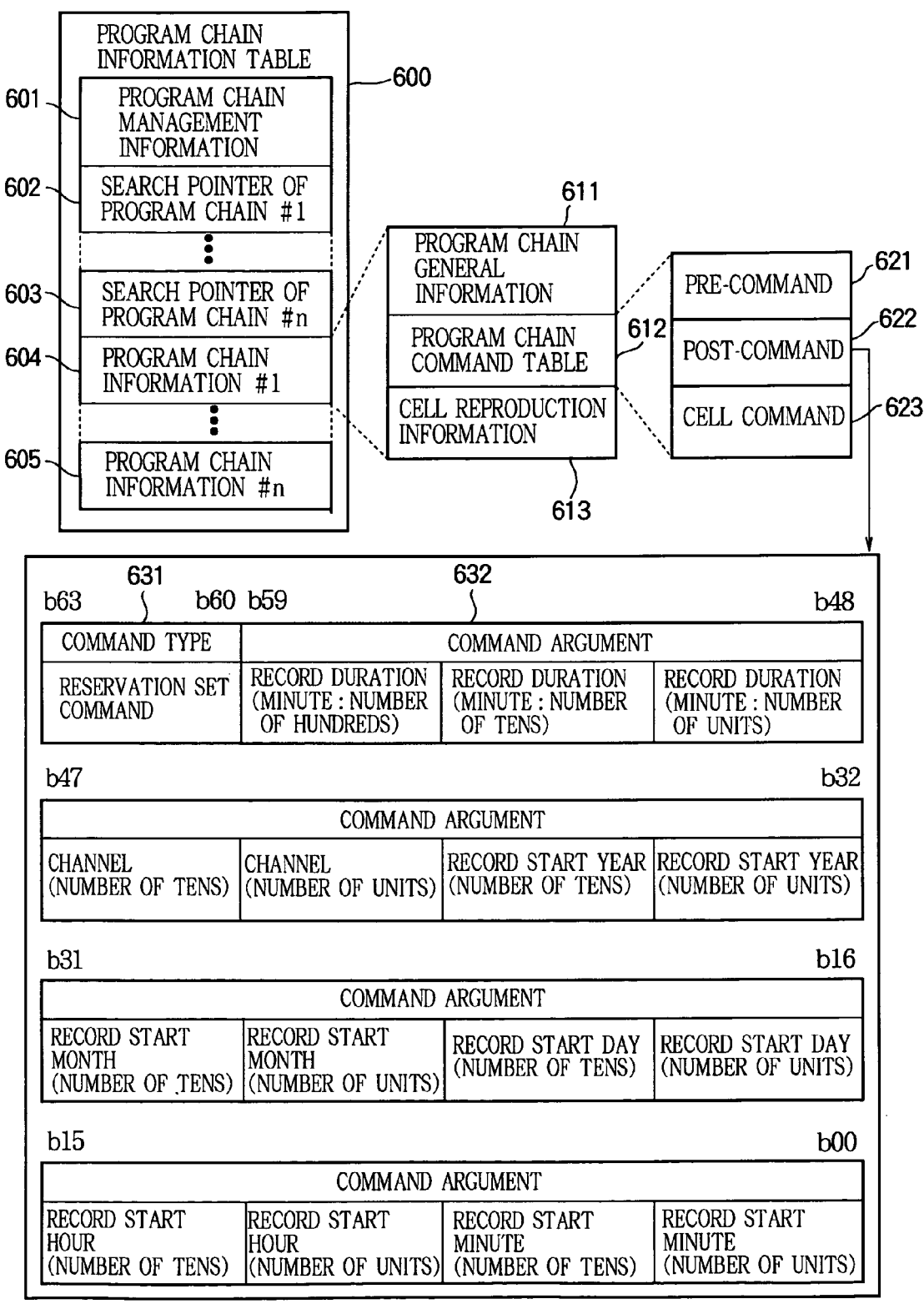
FIG. 8 shows a data structure related to a command in the second embodiment.

FIG. 8 shows a command data structure in the second embodiment. The command data is of a command to be executed after a program chain is reproduced, that is, after a preview program is reproduced (hereinafter referred to as a post-command). In this embodiment, a post-command 622, which is a command executed after a program chain is reproduced, will be described, but a pre-command 621 to be executed immediately before a program chain is reproduced or a cell command 623 can be used instead. However, the post-command 622 is preferable because the viewer can understand the description more easily by seeing the screen shown in FIG. 7 after the program chain is reproduced.

The data concerning the post-command is provided in a program chain information table 600 in the management information 1520. Although the command data can contain an instruction to control a reproduction operation as in the first embodiment, the present invention is characterized in that the command data is data to control a function, which used to be controlled directly by the viewer by means of a key or a remote controller in a video recording/reproducing apparatus.

The program chain information table 600 contains program chain management information 601, one or more program chain search pointers 602 and 603, and one or more items of program chain information 604 and 605. The total number of the program chains depends on the number of programs recorded on the optical disk. Each of the program chain information 604 and 605 includes program chain general information 611, a program chain command table 612, and cell reproduction information 613. The program chain general information 611 includes information indicating the reproduction time and the number of reproduction units of the program chain, and the cell reproduction information 613 defines a video reproduction sequence in the program chain. The program chain command table 612 contains a pre-command 621 to be executed before the program chain is reproduced, a post-command 622 to be executed after the program chain is reproduced, and a cell command 623 to be executed at each scene in the program chain. Each command includes a command type 631 and a command argument 632. The command type 631 indicates a basic instruction type, and the command argument 632 is used as a qualifier to the command type 631. In this embodiment, the command type 631 of the post-command 622 is "a reservation set command" for forcing a video reproducing apparatus to set a reservation of video recording of a selected program, and the command argument 632 contains "program attribute information" including at least the broadcast start time of the program.

FIG. 8 shows the data structure of the post-command 622 having a reservation set command and shows an example of code implementation on the assumption that the command is 64 bits long. The command type 631 and the command argument 632 are the same as those in the first embodiment as shown in FIG. 3.

Figure 9:
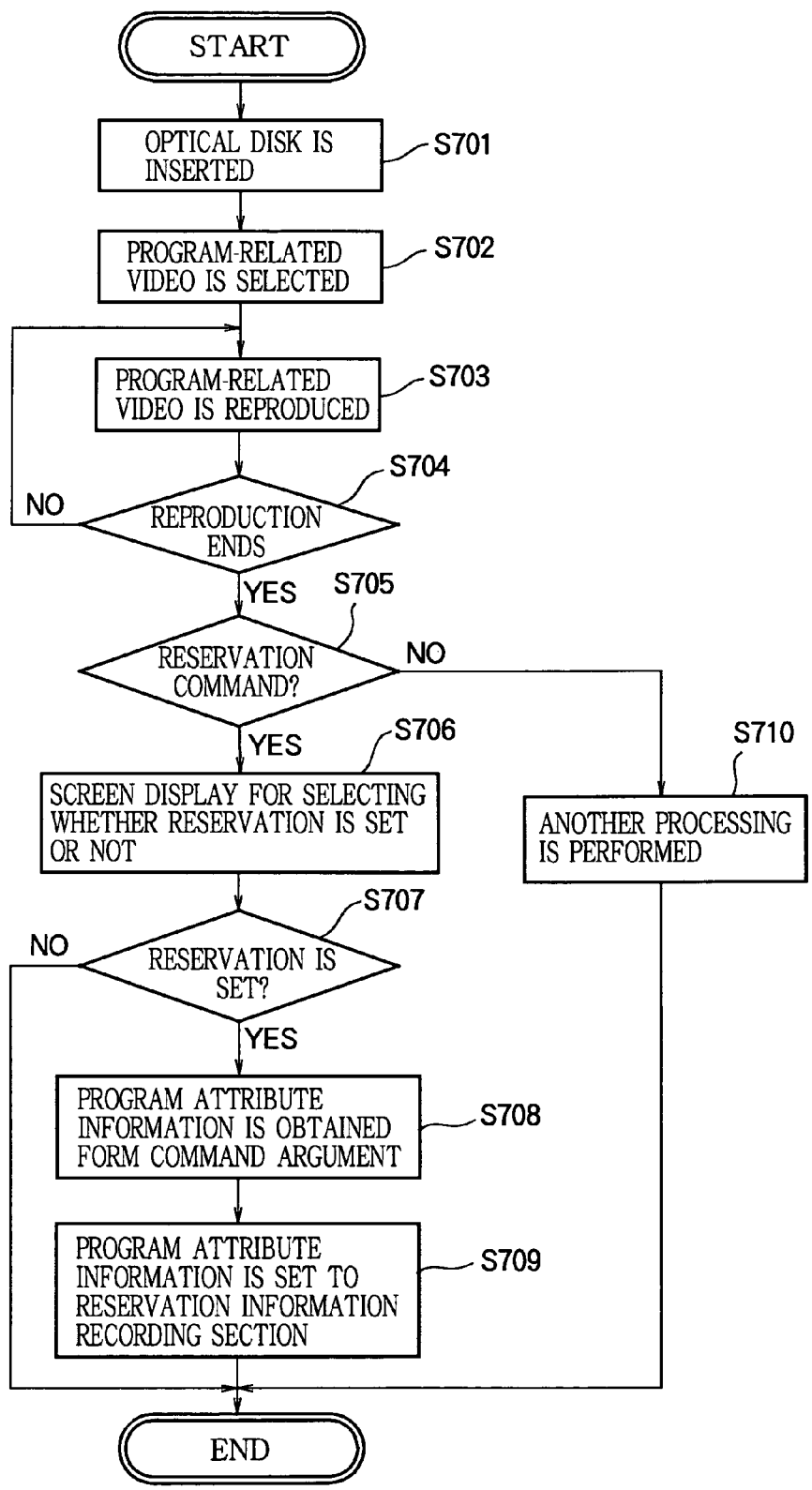
FIG. 9 is a flow chart showing setting process of a reservation of video recording in the second embodiment.

FIG. 9 shows a flow chart for the setting of a reservation of video recording in the second embodiment. Steps S701 to S703 in FIG. 9 correspond to steps S401 to S403 shown in FIG. 5 in the first embodiment. When the optical disk 100 is inserted into the DVD recording/reproducing driver 111 (shown in FIG. 4; hereinafter shown in the same way) (S701), the video display section 135 displays a selection image of a video to be watched. The viewer selects a video (program chain) related to a desired program from the group of programs recorded in the optical disk 100, through the operation section 121 (S702). The system controller 110 obtains reproduction information of the selected program chain from the management information 1520 accumulated in the reproduction control information acquisition section 134, and issues an instruction to supply the pack information 1521 of the corresponding program chain from the optical disk 100 to the video reproducing processor 133 in accordance with the reproduction information. The video reproducing processor 133 separates the supplied pack information 1521 to produce navigation information 1530 and encoded compressed video information 1531, carries out the decompression encoding of the video information 1531, and outputs analog video to the video display section 135, thereby reproducing the program chain (S703).

When the video reproduction of the program (program chain) ends (S704), the system controller 110 references a program chain information table 600 held in a reproduction control information acquisition section 134, and obtains information of the post-command 622 of the program chain. If the command type 331 of the post-command 622 is assigned a bit string identifying "a reservation set command", the system controller 110 judges that the post-command 622 sets a reservation of video recording (S705), displays a screen for selecting whether a reservation of video recording is set or not as shown in FIG. 7, on the video display section 135, and prompts the viewer to select whether a reservation is set or not (S706).

If the viewer judges from the video that he wants to watch the program and if the viewer wants to set a reservation of video recording, the video recording reservation set button 500 is selected from the operation section 121 (S707). If the viewer judges from the video that the viewer does not want to watch the program, the video recording reservation non-set button 501 is selected (S707), thereby finishing the setting of a reservation of video recording.

If the selection of the video recording reservation set button 500 is determined, the reservation command analyzer 137 obtains program attribute information from the command argument 632 of the post-command 622 (S708), converts the information to reservation information of video recording that can be recognized by the reservation information recorder 136, and transfers the reservation information of video recording to the reservation information recorder 136. The reservation information recorder 136 specifies the obtained reservation information of video recording, thereby setting the reservation of video recording of the video recording/reproducing apparatus (S709). If the reservation information of video recording specified to set the reservation of video recording overlaps or if a past time is reserved as a record start time, the system controller 110 informs the viewer that the reservation of video recording cannot be correctly set.

If the optical disk 100 is video-recordable, a program can be recorded in this optical disk. If the optical disk 100 is a reproduction-only disk or is a writable disk without a sufficient storage space, the system controller 110 prompts the viewer to replace the disk. When the viewer replaces the disk with a writable optical disk, the standby state for program recording is established. After a reservation of video recording is set (S408) and the standby state for program recording is established, the program is recorded as in the same way as in the first embodiment.

If the post-command 622 of the program chain is not assigned as the above-mentioned "reservation set command", the video recording/reproducing apparatus performs processing based on a command system defined under another scheme, such as transition to another program after the reproduction of the program chain is completed or modification to system-specific parameter settings (S710).

A user interface for setting a recording rate, which determines the recorded image quality, may be provided when a reservation of video recording is set. In that case, when the video recording/reproducing apparatus obtains reservation information of video recording, the video recording/reproducing apparatus displays a screen for prompting the selection of a recording rate. The viewer selects a desired recording rate from the operation section 121, and a reservation of video recording at a certain recording rate can be set.

In the second embodiment, the immediate data, i.e., program attribute information such as broadcast start date and time is specified as the reservation information of video recording the command argument 632, and the reservation information of video recording may also be numerical information such as a G code.

An identifier indicating whether the optical disk 100 is a disk for use in reservation-only or a general-purpose disk may be provided in the computer data area 1511 or management information 1520 on the optical disk 100, as in the same way as in the first embodiment.

A window prompting a selection regarding whether a reservation of video recording can be set, as shown in FIG. 7, may not be displayed after the reproduction of the program chain is completed, and a reservation of video recording may be set automatically when the reservation set command 631 is referenced after the reproduction ends. If a program-related video is watched until it is completed, the corresponding reservation of video recording is set automatically, so that the setting can be made reliably and simply.

According to the second embodiment, a reservation of video recording can be set easily after the program video of a specific program chain is viewed. In addition, a reservation set button need not be overlaid when a video is being reproduced, the visibility of the screen at the time of video watching can be enhanced.

Third Embodiment

In the first and second embodiments, the reproduction control information such as the navigation information 1530 and the management information 1520 includes a reservation set command together with program attribute information held as immediate data. In the third embodiment, the program attribute information is recorded in another directory or another reservation information of video recording table, isolated from the reservation set command, and identification information or a pointer is placed instead. Although an application to the first embodiment will be described below, an application to the second embodiment is also possible.

Figure 10:
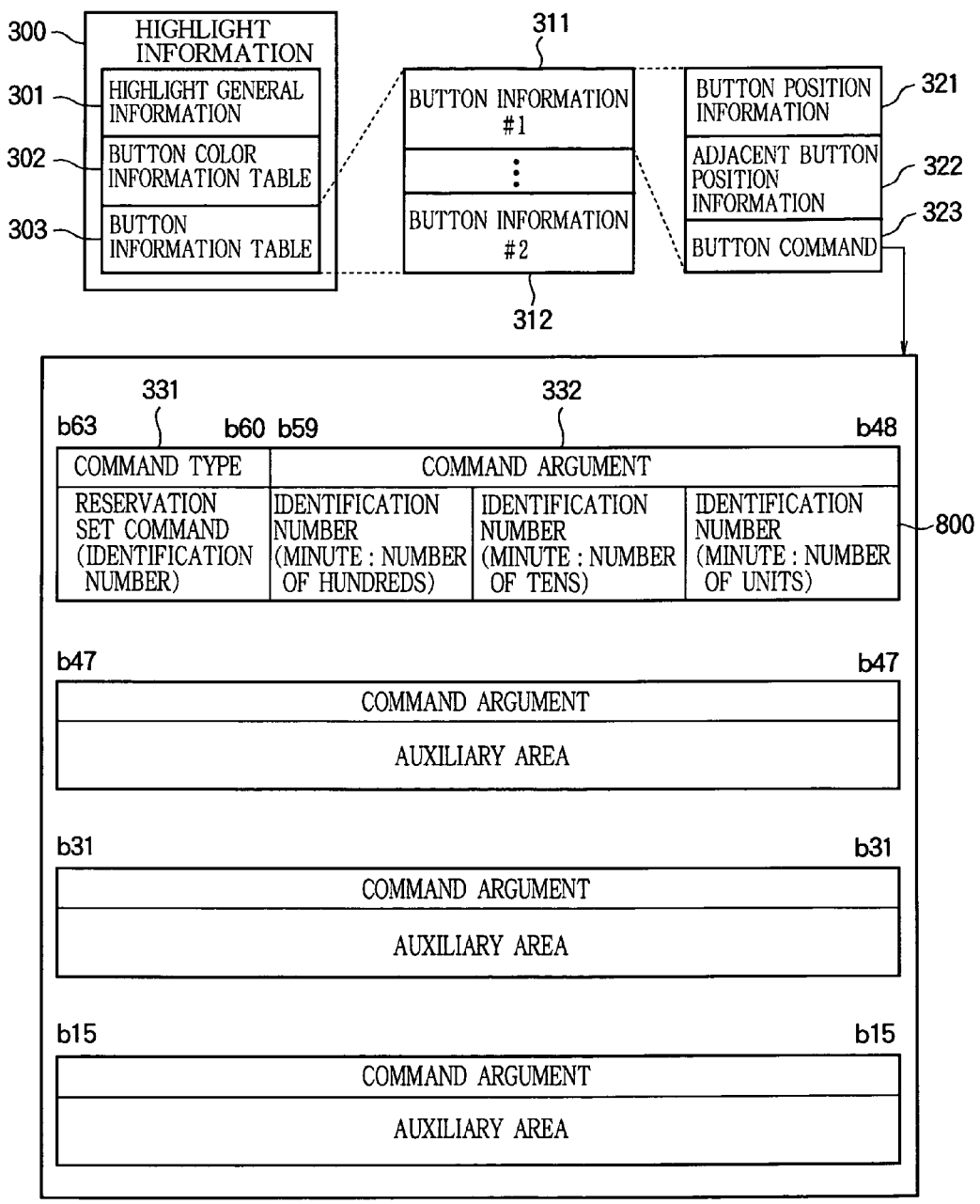
FIG. 10 shows a data structure related to a button in a third embodiment.

FIG. 10 shows a data structure related to a button in the third embodiment. In the command argument 332, an identification number 800 is specified. The identification number 800 uniquely identifies program attribute information to be read when a button is selected to determine that a reservation of video recording is set. The other respects have been already described in the first embodiment, and their description is omitted.

The data structure of the button command 323 having an instruction to set a reservation of video recording will be described in detail. An example of code implementation on the assumption that the command is 64 bits long will be presented here. If a 4-bit area of the 63rd bit to the 60th bit assigned to the command type 331 is set to '0000', the command is processed as "a reservation set command (identification number)."

In the command argument 332, the three-digit identification number 800 for uniquely identifying the program attribute information is allocated. The identification number is expressed in the BCD unit or the like, and the number of hundreds, the number of tens, and the number of units are specified. The bits are allocated as follows: The 59th bit to the 56th bit are allocated to the number of hundreds of the identification number; the 55th bit to the 52nd bit are allocated to the number of tens of the identification number; and the 51st bit to the 48th bit are allocated to the number of units of the identification number. With this setting, up to 999 items of program attribute information can be held.

Figure 11:
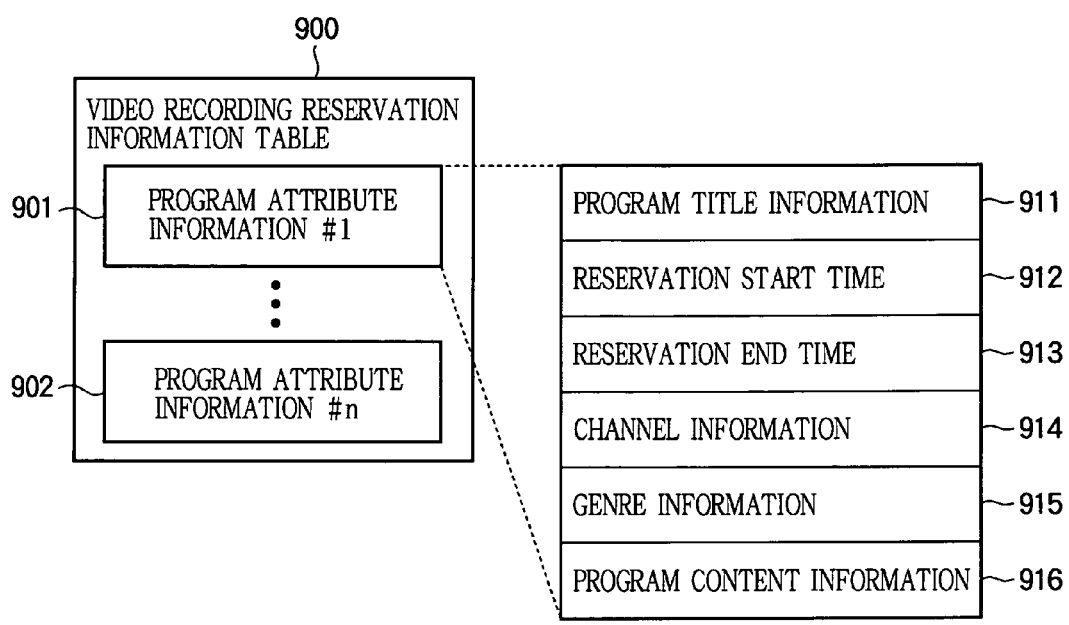
FIG. 11 shows an example of a data structure of reservation information of video recording in the third embodiment.

FIG. 11 shows an example of data structure of program attribute information identified by the identification number 800. Reservation information of video recording table 900 is a collection of program attribute information identified by the identification number 800, and the table is provided in the computer data area 1511. The individual items of program attribute information 901 and 902 include program name information 911, reservation start time information 912, reservation end time information 913, channel information 914, genre information 915, and program content information 916. The information is input as character strings, but numerical values may be recorded instead. The maximum amount of information allowed by the disk can be recorded, and data of such a large size can be input.

Figure 12:
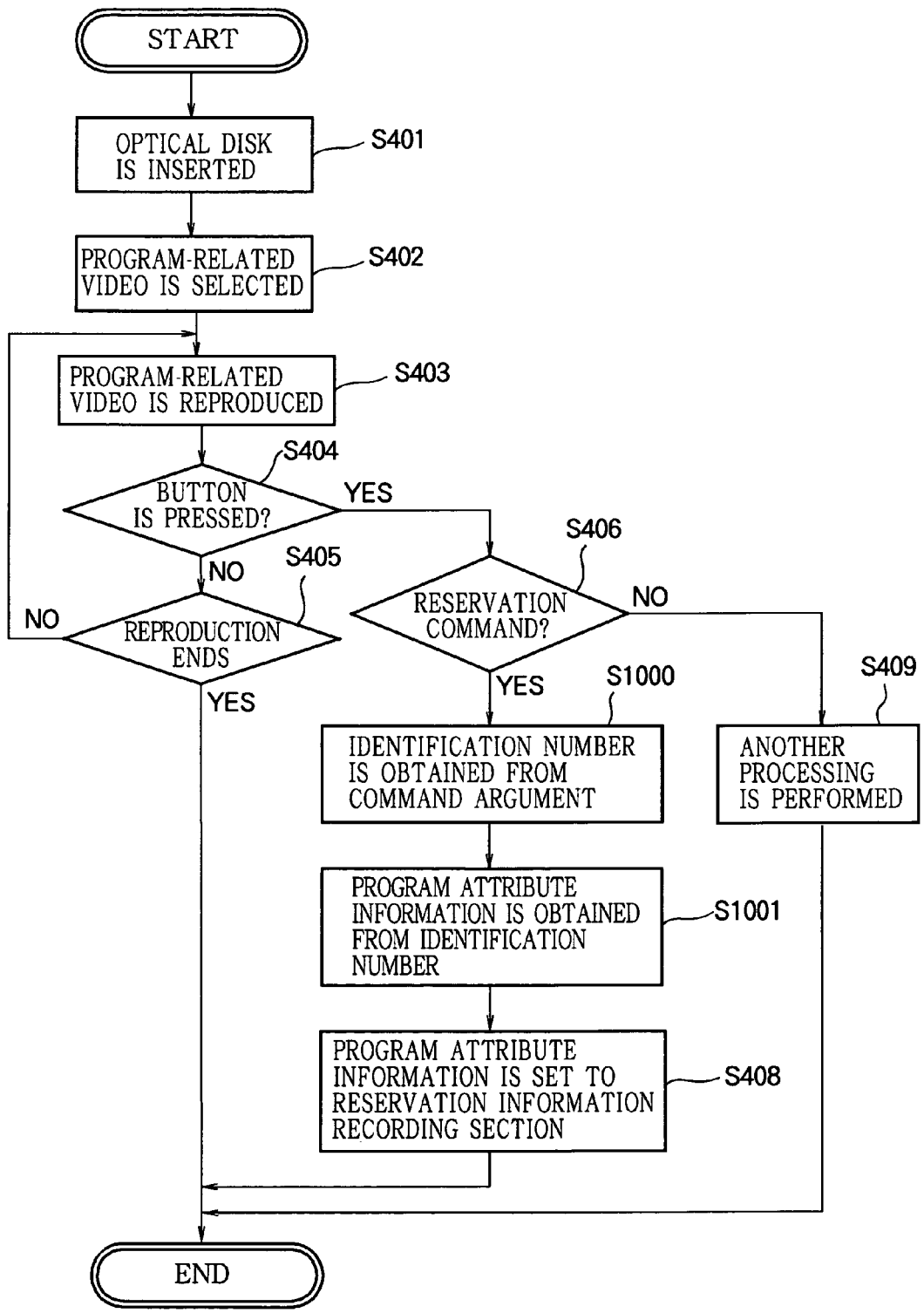
FIG. 12 is a flow chart showing setting process of a reservation of video recording in the third embodiment.

FIG. 12 shows a flow chart for the setting of a reservation of video recording in the third embodiment. The process up to the setting of a reservation of video recording by determining the selection of the video recording reservation button 201 (S405) is the same as in the first embodiment, and their description is omitted.

When the selection of the video recording reservation button 201 is determined, the system controller 110 references the highlight information 300 held in the reproduction control information acquisition section 134, and obtains the information of the button command 323 specified for the video recording reservation button 201. Then, if the command type 331 of the button command 323 is assigned a bit string indicting a reservation set command (identification number), the system controller 110 judges the command as a reservation set button command (S406). The reservation command analyzer 137 reads the identification number 800 specified in the command argument 332 (S1000), and obtains the program attribute information 901 corresponding to the identification number 800 from the computer data area 1511 (S1001). Then, the reservation command analyzer 137 converts the information to reservation information of video recording that can be recognized by the reservation information recorder 136 and transfers the reservation information of video recording to the reservation information recorder 136. The reservation information recorder 136 sets the supplied reservation information of video recording, thereby setting a reservation of video recording of the video recording/reproducing apparatus (S408). The other part is the same as in the setting of a reservation of video recording described above, and the standby state for program recording is established.

In this embodiment, video recording reservation data identified by the identification number 800 is referenced to the computer data area 1511, but the data may be referenced into the management information 1520 in the video data area 1510.

In the description provided above, program attribute information such as the reservation start time information, reservation end time information, and channel information is specified directly in the reservation information of video recording table 900, but the table may hold numerical information such as a G code, and the reservation of video recording may be set by referencing the G code.

According to the third embodiment, the command area does not need to include program attribute information, and a great amount of reservation information of video recording can be held independently of the command space, so that advanced settings of a reservation of video recording can be made.

Fourth Embodiment

In the first to third embodiments, a reproducing means for reproducing data from the optical disk 100 and a record means for recording a video program in accordance with a specified reservation of video recording are configured as a single recording/reproducing driver, which is a recording/reproducing means. In the fourth embodiment, the two means are configured as separate means. Although an application to the first embodiment will be described below, an application to another embodiment is also possible.

Figure 13:
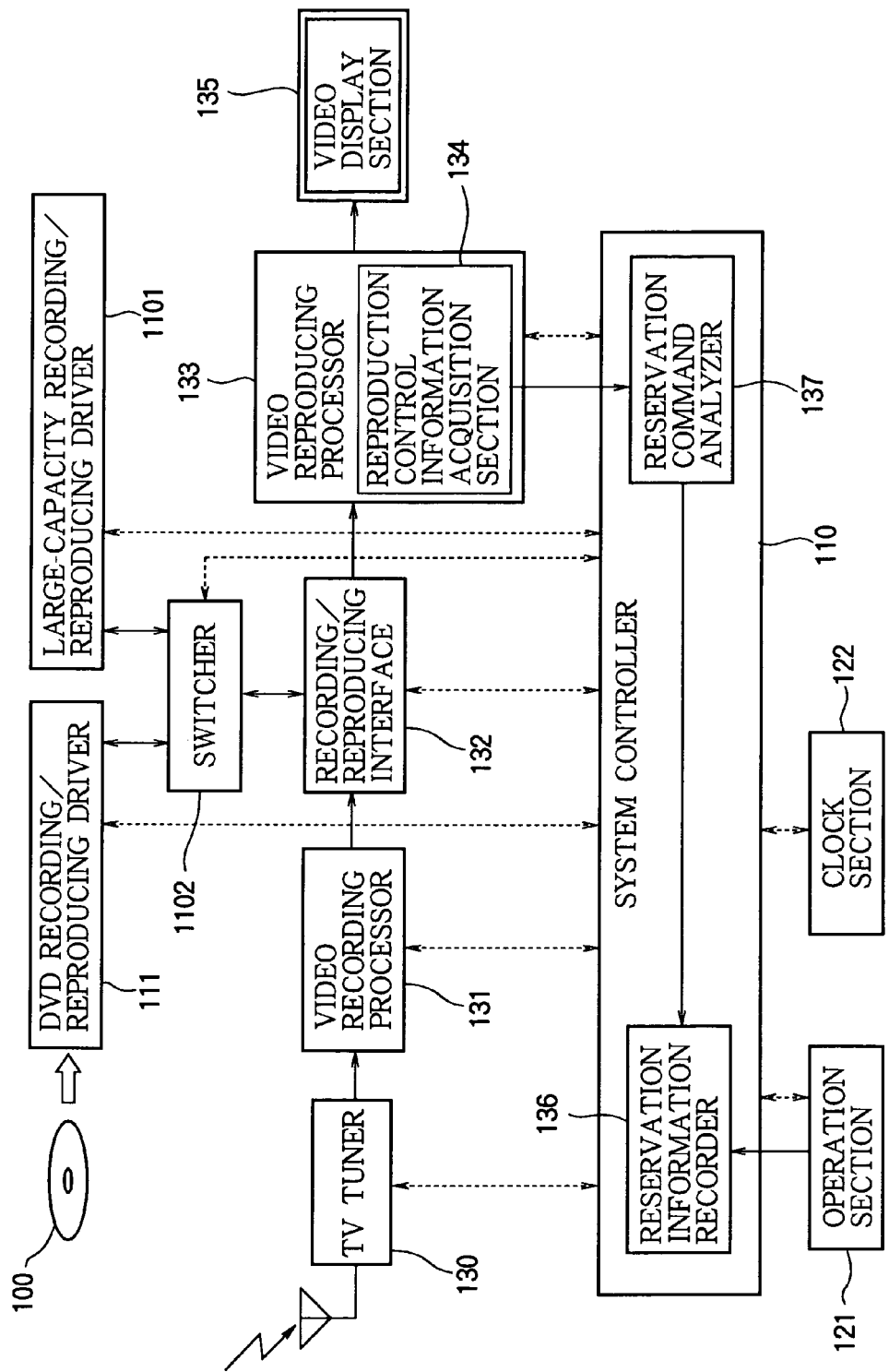
FIG. 13 is a block diagram showing a configuration of a video recording/reproducing apparatus in a fourth embodiment.

FIG. 13 is a block diagram showing a whole configuration of a video recording/reproducing apparatus of the fourth embodiment. A large-capacity recording/reproducing driver 1101 is a second drive which can record and play a video, and the driver can record a video of greater size than the DVD recording/reproducing driver 111. A switcher 1102 switches a connection between a recording/reproducing interface 132 and a DVD recording/reproducing driver 111 or large-capacity recording/reproducing driver 1101 in accordance with an instruction from a system controller 110. The other parts have already been described, and their descriptions are omitted. In the subsequent description, the large-capacity recording/reproducing driver 1101 is assumed to be a hard disk drive (HDD).

The operations of setting a reservation of video recording in the fourth embodiment will be described. In the description below, the reproduction section which plays the optical disk 100 to obtain program attribute information and the recording section which records a program in accordance with the program attribute information are configured as separate drive blocks and connected to each other in the same recording/reproducing apparatus. In FIG. 13, the reproduction section is a DVD recording/reproducing driver 111, and the recording section is a large-capacity recording/reproducing driver 1101 represented by a HDD. The process (S405) up to the setting of a reservation of video recording by determining to select the reservation of video recording button 201 is the same as in the first embodiment, and its description is omitted.

The operations of setting a reservation of video recording when the selection of the video recording reservation button 201 is determined will be described in detail. When a determination is made to select the video recording reservation button 201, the system controller 110 references the highlight information 300 held in the reproduction control information acquisition section 134 to obtain information of the button command 323 specified for the video recording reservation button 201. If the command type 331 of the button command is assigned a bit string indicating a reservation set command, the system controller 110 records the program attribute information held in the command argument 332 in the reservation information recorder 136. Then, the system controller 110 displays a screen for prompting the viewer to select a recording drive where the program is recorded. The viewer selects whether the reserved program is recorded in the DVD recording/reproducing driver 111 or the large-capacity recording/reproducing driver 1101. If the DVD recording/reproducing driver 111 is selected, the system controller 110 instructs the switcher 1102 to connect the DVD recording/reproducing driver 111 and the recording/reproducing interface 132. If the large-capacity recording/reproducing driver 1101 is selected, the system controller 110 instructs the switcher 1102 to connect the large-capacity recording/reproducing driver 1101 and the recording/reproducing interface 132. Then, the standby state for program recording is established, as in the normal operations for setting a reservation of video recording described above.

The large-capacity recording/reproducing driver 1101 which records a program can be a second DVD recording/reproducing drive, VTR, or the like differing from the DVD recording/reproducing driver 111, as well as a HDD. Although one large-capacity recording/reproducing driver 1101 is provided in the description given above, a plurality of large-capacity recording/reproducing drive blocks 1101 may be provided.

According to the fourth embodiment, a recording drive can be selected as desired, and the need for replacing the optical disk 100 is eliminated even if the optical disk is a reproduction-only disk, so that the time and trouble of the viewer can be saved, and a reservation of video recording can be set with a high degree of flexibility.

Fifth Embodiment

In the fourth embodiment, the reproduction section for reproducing data from an optical disk 100 to obtain the program attribute information and the recording section for recording a video in accordance with the program attribute information are provided in the same video recording/reproducing apparatus. In the fifth embodiment, the reproduction section and the recording section are configured as separate video reproducing apparatuses and connected to each other by a transmission line 1104.

Figure 14:
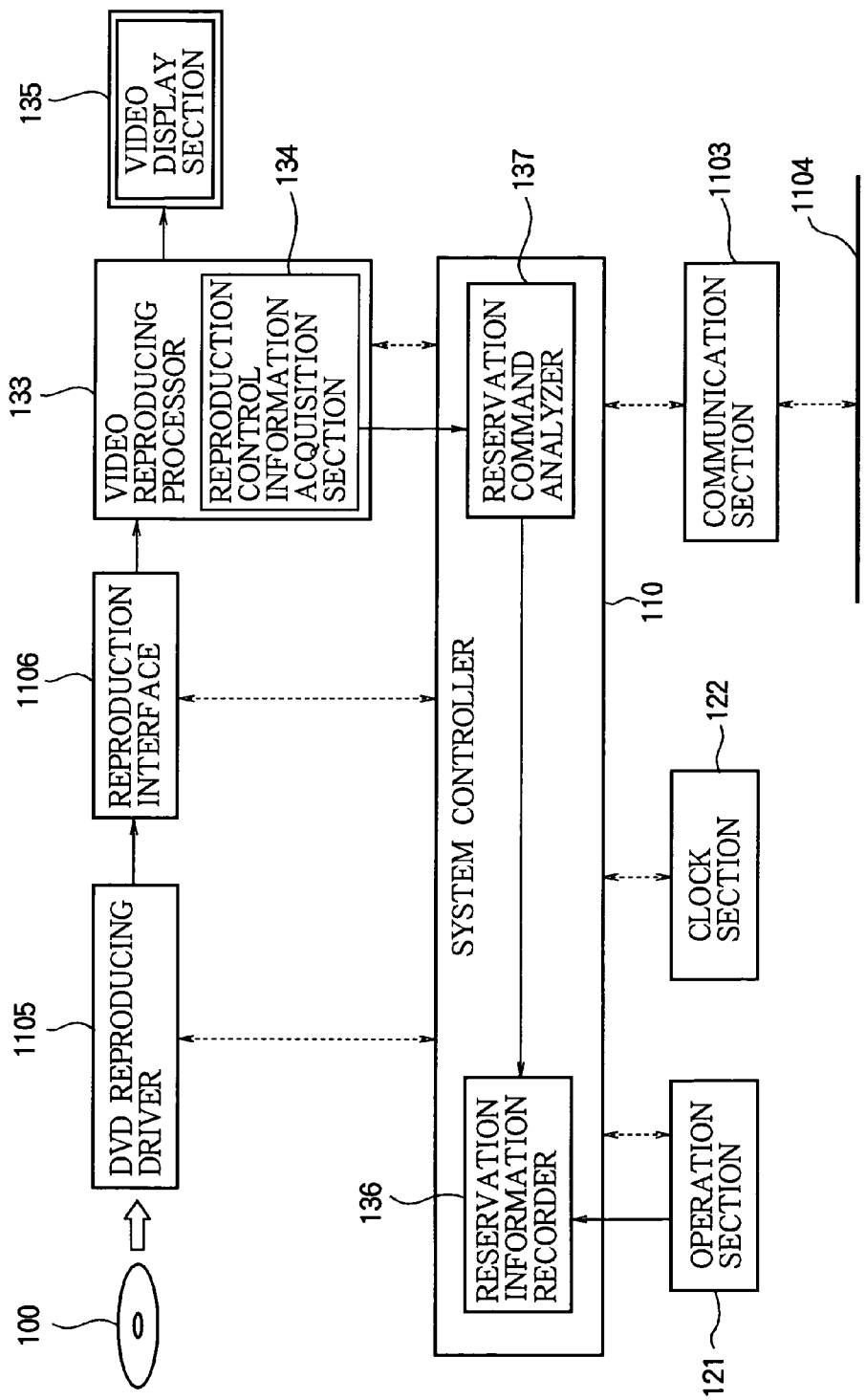
FIG. 14 is a block diagram showing a configuration of a video reproducing apparatus in a fifth embodiment.

FIG. 14 is a block diagram showing a configuration of a video reproducing apparatus of the fifth embodiment. A communication section 1103 exchanges the program attribute information held in a reservation information recorder 136 with external equipment, in accordance with a command from a system controller 110. The transmission line 1104 is a communication channel through which the communication section 1103 transmits and receives the program attribute information. A DVD reproducing driver 1105 reads a signal from the optical disk 100. A reproduction interface 1106 reads a signal obtained through modulation, demodulation, and error-correction of the signal from the DVD reproducing driver 1105. The other respects are the same as in the first embodiment, shown in FIG. 4, and the fourth embodiment, shown in FIG. 13.

Figure 15:
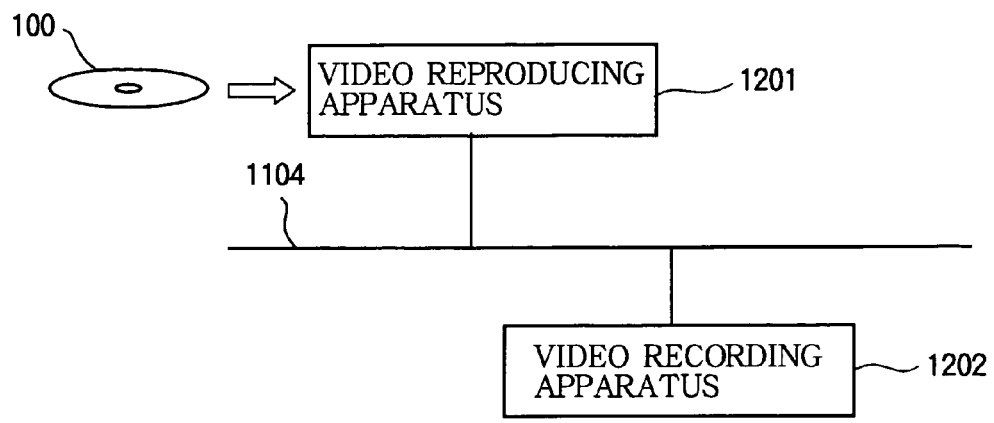
FIG. 15 is a diagram showing a system configuration in the fifth embodiment.

FIG. 15 shows a part of a system configuration of the fifth embodiment. A video reproducing apparatus 1201 configured as shown in FIG. 14 plays the optical disk 100 to obtain the program attribute information, and sends the program attribute information. A video recording apparatus 1202 receives the program attribute information through the transmission line 1104 and sets a reservation of video recording in accordance with the program attribute information.

Operations of setting a reservation of video recording in the fifth embodiment will next be described. The process (S405) up to the setting of a reservation of video recording by determining to select the video recording reservation button 201 is the same as in the first embodiment.

Operations to set a reservation of video recording when the selection of the video recording reservation button 201 is determined will be described in detail. When a determination is made to select the video recording reservation button 201, the system controller 110 in the video reproducing apparatus 1201 references the highlight information 300 contained in the reproduction control information acquisition section 134 to obtain the information of the button command 323 specified for the video recording reservation button 201. If a bit string indicating a reservation set command is assigned as the command type 331 of the button command 323, the system controller 110 records the program attribute information held in the command argument 332 in the reservation information recorder 136. Then, the system controller 110 of the video reproducing apparatus 1201 detects a recordable driver from the video recording apparatus 1202 connected through the transmission line 1104 and displays a screen which prompts the viewer to select the video recording apparatus 1202 to be used for recording. When the viewer selects the video recording apparatus 1202 from the operation section 121, the system controller 110 in the video reproducing apparatus 1201 supplies the program attribute information held in the reservation information recorder 136 to the communication section 1103. The communication section 1103 sends the program attribute information to the video recording apparatus 1202 through the transmission line 1104 in a communication method supported by the video recording apparatus 1202. The video recording apparatus 1202 receives the program attribute information, sets a reservation of video recording in accordance with the information, and, when the operations to set the reservation of video recording end normally, informs the video reproducing apparatus 1201 that the reservation has been performed normally.

The video recording apparatus 1202 does not need to have the reservation command analyzer 137 for identifying the reservation set command and should be just an apparatus for setting a reservation of video recording, that is, the apparatus needs not be a DVD recording apparatus and may be a VTR or the like.

In the video reproducing apparatus 1201, the program attribute information is recorded in the reservation information recorder 136 and then transmitted through the transmission line 1104, and the timing of transmission can be immediately after the viewer selects the video recording apparatus 1202 through the operation section 121 or can be the video recording start time or a certain time, such as five minutes, before the video recording start time, in accordance with the time information obtained from the clock section 122.

One video recording apparatus 1202 is provided in the description given above, and two or more video recording apparatuses 1202 may also be provided.

The transmission line 1104 can be a wired LAN, modem cable, IEEE cable, and the like, and can also be a wireless LAN. Any type of communication protocol can be used.

According to the fifth embodiment, a recording drive can be selected, and the replacement of the optical disk 100 is not required even if the optical disk is a reproduction-only disk, so that the time and trouble of the viewer can be saved, and the reservation of video recording can be set with a high degree of flexibility. A reservation of video recording of a program can be set even if the video reproducing apparatus 1201 has neither a video recording function nor a video recording reservation set function. Moreover, the video recording apparatus 1202 can set a reservation of video recording even without a function to read a video recording reservation command from the optical disk 100.

Sixth Embodiment

In the embodiments described above, the optical disk 100 is mostly a reproduction-only disk. In the sixth embodiment, a single optical disk 100 has a reproduction-only area and a recordable area. An application to the first embodiment will be described below, but applications to the other embodiments are also possible.

Figure 16:
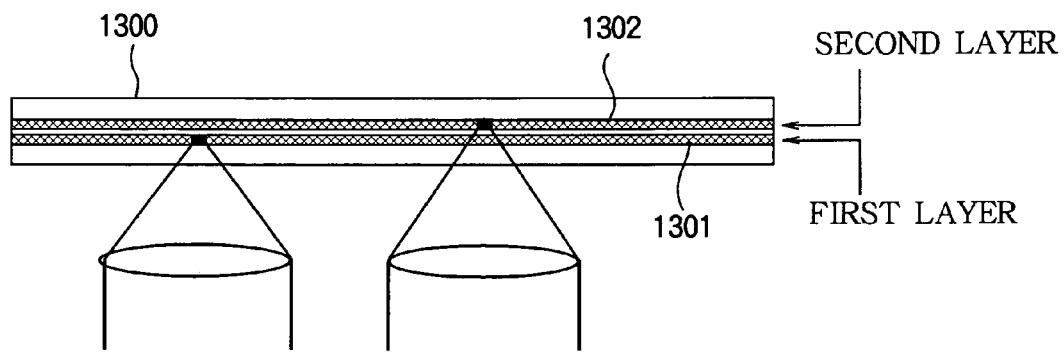
FIG. 16 is a cross-sectional view showing a portable recording medium in a sixth embodiment.

FIG. 16 shows a cross-sectional view of a portable recording medium used in the sixth embodiment. As shown in FIG. 16, the portable recording medium used in the sixth embodiment is a single-sided dual-layer medium 1300, and the focal position of the optical pickup is changed to switch the recording side and read and write information on different recording sides. On the single-sided dual-layer DVD 1300, a first recording layer 1301 has a reproduction-only area where data is recorded in the structure as described in the first embodiment, and the recording layer is formed as a layer closer to the optical pickup, which is not shown. A second recording layer 1302 has a recordable area, as provided on a DVD-R disk or a DVD-RW disk, and the recording layer is formed as a layer farther from the optical pickup. The second recording layer 1302 is used as a recordable area for recording a program for which a video recording program has been set.

Operations of setting a reservation of video recording in the sixth embodiment will be described. When the single-sided dual-layer DVD disk 1300 is inserted into a DVD recording/reproducing driver 111, data is read from the reproduction-only recording layer, or the first recording layer 1301, in a format corresponding to the first embodiment. The subsequent process (S405) up to the setting of a reservation of video recording by determining the selection of a video recording reservation button 201 is the same as in the first embodiment.

Operations of setting a reservation of video recording by determining to select the video recording reservation button 201 will be described in detail. When the selection of the video recording reservation button 201 is determined, a system controller 110 references highlight information 300 contained in a reproduction control information acquisition section 134 to obtain the information of a button command 323 specified for the video recording reservation button 201. If a bit string indicating a reservation set command is assigned as the command type 331 of the button command 323, the system controller 110 judges that the button command 323 sets a reservation of video recording, and the program attribute information specified in the command argument 332 is accumulated in the reservation information recorder 136, thereby setting a reservation of video recording of the video recording/reproducing apparatus. The system controller 110 sets the focal position of the optical pickup onto the writable second recording layer 1302 of the portable recording medium and sets the video recording of the program on the second recording layer 1302, so that the disk does not have to be replaced to a writable disk after the reservation of video recording is set. Consequently, operations to replace the disk can be avoided, and the system can be constructed to reduce the time and trouble of the viewer. Moreover, the system controller 110 can obtain the recording time of the program for which a reservation of video recording has been set and the size of the recordable area, so that the video can be recorded at an optimum recording rate. Then, the standby state for program recording is established, as in the setting of a reservation of video recording described above.

A user interface to set a recording rate, which determines the recorded image quality, can be provided when a reservation of video recording is set, as in the first embodiment. In the sixth embodiment, the system controller 110 can obtain the recording size information of the program for which the reservation of video recording has been set and the recordable area information, and can accordingly set the program recording at an optimum recording rate for the disk. It can be checked whether the disk has a sufficient recordable area, so that problems such as failure to record the second half of the program can be prevented before they happen.

In the description given above, the first recording layer 1301 of the single-sided dual-layer DVD disk 1300 is a reproduction-only recording layer, and the second recording layer 1302 is a writable recording layer. Conversely, the first recording layer 1301 can be a writable recording layer, and the second recording layer 1302 can be a reproduction-only recording layer. However, in the respect of efficiency of reflection of the recording layers, it would be better that the first recording layer 1301 be a reproduction-only recording area and the second recording layer 1302 be a recordable area. In addition, both recording layers of the single-sided dual-layer DVD disk 1300 may be writable.

The computer data area 1511 or the management information 1520 may have an identifier indicating that the single-sided dual-layer DVD disk 1300 is disk for use in reservation-only and has a recordable area. This prevents a general-purpose disk from being misidentified as a disk for use in reservation-only and a reservation of video recording from being set accidentally even if the disk has the same bit information as the code of the reservation set command of the present invention in the reproduction control information area, and the program attribute information can be read from the single-sided dual-layer DVD disk 1300 reliably and the program can be recorded reliably.

Figure 17:
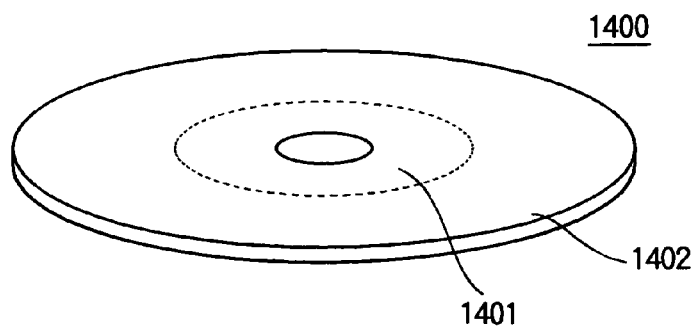
FIG. 17 shows another example of a portable recording medium in the sixth embodiment.

In the sixth embodiment described above, the single-sided dual-layer DVD disk 1300 has a reproduction-only area and a recordable area. An optical disk used in this embodiment may also be a single-layer optical disk 1400 having a reproduction-only area 1401 which holds the encoded compressed video information of the program, a reservation set command, and program attribute information and a recordable area 1402 which can record a program for which a reservation of video recording has been set, as shown in FIG. 17. FIG. 17 shows that the optical disk 1400 has the reproduction-only area 1401 in an inner area and the recordable area 1402 in an outer area, but the reproduction-only area 1401 may be placed in the outer area, and the recordable area 1402 may be placed in the inner area. In addition, the reproduction-only area 1401 and the recordable area 1402 may be configured in a mixed state. For example, if there are program chains related to a plurality of programs, the recordable area 1402 may be placed between the program chains so that the program corresponding to the program chain can be recorded there.

According to the sixth embodiment, the disk does not have to be replaced with a writable disk after a reservation of video recording is set. This saves the time and trouble of replacing the disk and prevents video recording from being missed because of failure to insert a disk for recording after the reservation of video recording is set. Because the recording size of the reserved program and the size of the recordable area of the disk are known when the reservation of video recording is set, the program can be recorded at an optimum video recording rate. In addition, it can be checked whether the disk has a sufficient recordable area, so that problems such as failure to record the second half of the program can be prevented before they happen.

The embodiments have been described about a television broadcast program, but these embodiments can be applied to a radio broadcast program in the same manner. In that case, encoded compressed audio information (or upcoming audio information) related to a radio program should be recorded on the portable recording medium, instead of the preview video information.

In the description given above, videos recorded in advance on the optical disk are recorded in the DVD-Video format. With the format, a modification from the current format is minimized, and the current video reproducing apparatuses show a high level of reproduction compatibility. However, videos may be recorded in a different format. A DVD-ROM, DVD-RW, DVD-R, and non-DVD optical disks may also be used as the portable recording medium.

INDUSTRIAL APPLICABILITY

According to the present invention, a reliable and simple video or audio recording reservation can be set by executing a reservation set command. A reservation of video recording or audio recording of a program can be set while checking the video or audio program content, and the reservation can be set for a carefully selected program.

The invention claimed is:

1. A non-transitory portable recording medium on which information is digitally recorded to be read and processed by a processor-based apparatus, said digitally recorded information comprising:
   reproducible information comprising at least one of encoded compressed video information and encoded compressed audio information, which is related to a program to be broadcasted, the reproducible information being recorded on the portable recording medium in such manner as to be capable of being decoded, decompressed, and reproduced by the processor-based apparatus;
   a reservation set command recorded on the portable recording medium in relationship with the reproducible information in such manner as to be capable of being executed by the processor-based apparatus, while the reproducible information is being reproduced or in response thereto, to set a reservation of video recording and/or audio recording of the program;
   program attribute information including at least a broadcast start time of the program, which is recorded on the portable recording medium in relationship with the reproducible information and the reservation set command in such manner as to be capable of being used by the processor-based apparatus to set the reservation; and
   button information causing the processor-based apparatus to display a button when the reproducible information is reproduced, and selection of said button by a user causes the processor-based apparatus to execute the reservation set command and prompt the user to remove the portable recording medium therefrom and insert another recording medium,
   wherein said portable recording medium is an optical disk.

2. The portable recording medium according to claim 1, the digitally recorded information further comprising video information digitally recorded on the portable medium in such manner as to be capable of being used by the processor-based apparatus during reservation setting to select whether a reservation of video recording and/or audio recording of the program is set or not;

wherein when a selection is made to set a reservation of video recording and/or audio recording of the program, the reservation set command functions as a command for setting the reservation of video recording and/or audio recording of the program.

3. The portable recording medium according to claim 1, wherein the reservation set command and the program attribute information are contained in reproduction control information of a video unit; the reproduction control information being placed at a leading end of each video unit; the video unit comprising an I-picture, data of which is compressed within a frame, a P-picture, data of which is compressed with motion compensation of the I-picture preceding in time, and a B-picture, data of which is compressed with motion compensation of the I-picture or P-picture preceding or following in time.

4. The portable recording medium according to claim 1, the digitally recorded information further comprising an identification number for identifying the program attribute information;

wherein the reservation set command and the identification number are contained in reproduction control information of a video unit; the reproduction control information being placed at a leading end of each video unit; the video unit comprising an I-picture, data of which is compressed within a frame, a P-picture, data of which is compressed with motion compensation of the I-picture preceding in time, and a B-picture, data of which is compressed with motion compensation of the I-picture or P-picture preceding or following in time.

5. A video recording and reproducing apparatus for reproducing data from the reproducible information recorded on the portable recording medium of claim 4, the video recording/reproducing apparatus comprising:

at least one processor configured to:
obtain the reservation set command of the portable recording medium; and
obtain program attribute information corresponding to the identification number in accordance with the reservation set command, and set a reservation of video recording and/or audio recording on the basis of the program attribute information.

6. The portable recording medium according to claim 1, wherein the reservation set command and the program attribute information are contained in a command table in a management area placed in a lump in the portable recording medium, the command table being referenced after the program ends.

7. A video recording and reproducing apparatus for reproducing data from the reproducible information recorded on the portable recording medium of claim 6, the video recording/reproducing apparatus comprising:

at least one processor configured to:
obtain the reservation set command, with reference to a command table after the program ends; and
set a reservation of video recording and/or audio recording on the basis of the program attribute information in accordance with the reservation set command when a selection is made to set a reservation of video recording and/or audio recording of the program.

8. The portable recording medium according to claim 1, the digitally recorded information further comprising an identification number for identifying the program attribute information;

wherein the reservation set command and the program attribute information are contained in a command table in a management area placed in a lump in the portable recording medium, the command table being referenced after the program ends.

9. The portable recording medium according to claim 1, the digitally recorded information further comprising an identifier indicating whether the portable recording medium holds the reservation set command and the program attribute information or not.

10. A video recording and reproducing apparatus for reproducing data from the reproducible information recorded on the portable recording medium of claim 9, the video recording/reproducing apparatus comprising:

at least one processor configured to:
determine whether a reservation of video recording and/or audio recording in accordance with the reservation set command is set or not, on the basis of an identifier held in the portable recording medium;
obtain the reservation set command of the portable recording medium in accordance with a result of the determination of whether the reservation is set or not; and
obtain the program attribute information in accordance with the reservation set command, and set a reservation of video recording and/or audio recording on the basis of the program attribute information.

11. The portable recording medium according to claim 1, wherein the portable recording medium comprises a reproduction-only area and a recordable area;

the reproduction-only area holding the reproducible information, the reservation set command, and the program attribute information;
the recordable area being an area, in which video recording and/or audio recording of the program can be made.

12. The portable recording medium according to claim 11, wherein the portable recording medium is a single-sided dual-layer recording medium comprising a first recording layer and a second recording layer;

the first recording layer comprising the reproduction-only area;
the second recording layer comprising the recordable area.

13. A video recording and reproducing apparatus for reproducing data from the reproducible information recorded on the portable recording medium of claim 11, the video recording/reproducing apparatus comprising:

at least one processor configured to:
obtain the reservation set command of the portable recording medium; and
obtain the program attribute information in accordance with the reservation set command, and set a reservation of video recording and/or audio recording in a recordable area on the basis of the program attribute information.

14. A video reproducing apparatus for reproducing data from the reproducible information recorded on the portable recording medium of claim 1, the video reproducing apparatus comprising:

at least one processor configured to:
obtain the reservation set command of the portable recording medium;
obtain the program attribute information in accordance with the reservation set command; and
cause the program attribute information to be transmitted from the video reproducing apparatus.

15. A video recording apparatus comprising:
at least one processor configured to:
receive the program attribute information transmitted from the video reproducing apparatus of claim 14;
set a reservation of video recording and/or audio recording on the basis of the received program attribute information; and
record the program in accordance with the reservation of video recording and/or audio recording, which has been set.

16. A video recording/reproducing apparatus for reproducing data from the reproducible data recorded on the portable recording medium of claim 1, the video recording/reproducing apparatus comprising:
at least one processor configured to:
reproduce data from the portable recording medium;
obtain the reservation set command of the portable recording medium;
obtain the program attribute information in accordance with the reservation set command, and set a reservation of video recording and/or audio recording on the basis of the program attribute information; and
record the program in accordance with the reservation of video recording and/or audio recording, which has been set.

17. A method of reading and processing data from the information digitally recorded on the portable recording medium of claim 1, the method comprising the steps of:
reading at least part of the reproducible information stored on the portable recording medium related to the program, and reproducing data from the read reproducible information;
obtaining the reservation set command of the portable recording medium;
obtaining the program attribute information in accordance with the reservation set command; and
sending the program attribute information.

18. A video recording method comprising the steps of:
receiving the program attribute information sent in accordance with claim 17;
setting a reservation of video recording and/or audio recording in accordance with the program attribute information, which has been received; and
recording the program in accordance with the reservation of video recording and/or audio recording, which has been set.

19. The portable recording medium according to claim 1, wherein the digitally recorded information further comprises button display video information, which includes information related to the reservation, digitally recorded on the portable medium in such manner as to be capable of being used by the processor-based apparatus for displaying at least one button overlaid on a displayed image which is related to the program to be broadcasted.

20. A video recording and reproducing apparatus for reproducing data from reproducible information recorded on a non-transitory portable recording medium, the video recording/reproducing apparatus comprising:
at least one processor configured to:
obtain a reservation set command of the portable recording medium; and
obtain program attribute information in accordance with the reservation set command, and set a reservation of video recording and/or audio recording in accordance with the program attribute information,
wherein the portable recording medium is an optical disk, and
wherein on the portable recording medium is digitally recorded information to be read and processed by the apparatus comprising:
the reproducible information, which comprises at least one of encoded compressed video information and encoded compressed audio information, which is related to a program to be broadcasted, the reproducible information being recorded on the portable recording medium in such manner as to be capable of being decoded, decompressed, and reproduced by the apparatus;
the reservation set command, which is recorded on the portable recording medium in relationship with the reproducible information in such manner as to be capable of being executed by the apparatus, while the reproducible information is being reproduced or in response thereto, to set the reservation of video recording and/or audio recording of the program; and
the program attribute information, which includes at least a broadcast start time of the program, and which is recorded on the portable recording medium in relationship with the reproducible information and the reservation set command in such manner as to be capable of being used by the apparatus to set the reservation; and
button information causing the video recording and reproducing apparatus to display a button when the reproducible information is reproduced, and selection of said button by a user causes the at least one processor to execute the reservation set command and prompt the user to remove the portable recording medium therefrom and insert another recording medium.

21. A method in a processor-based apparatus of reading and processing data from the information digitally recorded on a non-transitory portable recording medium, the method comprising the steps of:
reading at least part of reproducible information stored on the portable recording medium related to the program, and reproducing data from the read reproducible information;
obtaining a reservation set command of the portable recording medium; and
obtaining program attribute information in accordance with the reservation set command and setting a reservation of video recording and/or audio recording on the basis of the program attribute information,
wherein the portable recording medium is an optical disk, and
wherein the information digitally recorded on the portable recording medium comprises:
the reproducible information, which comprises at least one of encoded compressed video information and encoded compressed audio information, which is related to a program to be broadcasted, the reproducible information being recorded on the portable recording medium in such manner as to be capable of being decoded, decompressed, and reproduced by the processor-based apparatus;
the reservation set command, which is recorded on the portable recording medium in relationship with the reproducible information in such manner as to be capable of being executed by the processor-based apparatus, while the reproducible information is being reproduced or in response thereto, to set the reservation of video recording and/or audio recording of the program;

the program attribute information, which includes at least a broadcast start time of the program, and which is recorded on the portable recording medium in relationship with the reproducible information and the reservation set command in such manner as to be capable of being used by the processor-based apparatus to set the reservation; and button information causing the processor-based apparatus to display a button when the reproducible information is reproduced, and selection of said button by a user causes the processor-based apparatus to execute the reservation set command and prompt the user to remove the portable recording medium therefrom and insert another recording medium.

\* \* \* \* \*